US010824335B2

(12) United States Patent
Rostoker et al.

(10) Patent No.: US 10,824,335 B2
(45) Date of Patent: Nov. 3, 2020

(54) DEVICE AND METHOD TO STORE PREDICTED DATA AT A HOST MEMORY

(71) Applicant: SanDisk Technologies LLC, Plano, TX (US)

(72) Inventors: Tal Rostoker, Kfar Vradim (IL); Alon Marcu, Tel-Mond (IL); Rotem Sela, Haifa (IL)

(73) Assignee: WESTERN DIGITAL TECHNOLOGIES, Inc., San Jose, CA (US)

( * ) Notice: Subject to any disclaimer, the term of this patent is extended or adjusted under 35 U.S.C. 154(b) by 0 days.

(21) Appl. No.: 14/330,710

(22) Filed: Jul. 14, 2014

(65) Prior Publication Data

US 2016/0011964 A1 Jan. 14, 2016

(51) Int. Cl.
*G06F 3/06* (2006.01)
*G06F 12/02* (2006.01)

(52) U.S. Cl.
CPC .............. *G06F 3/06* (2013.01); *G06F 3/0611* (2013.01); *G06F 3/0659* (2013.01); *G06F 3/0673* (2013.01); *G06F 12/0215* (2013.01); *G06F 12/0246* (2013.01); *G06F 2212/1016* (2013.01); *G06F 2212/7202* (2013.01)

(58) Field of Classification Search
None
See application file for complete search history.

(56) References Cited

U.S. PATENT DOCUMENTS

| 4,896,289 | A | * | 1/1990 | Svinicki | G06F 3/1293 714/34 |
| 5,829,017 | A | | 10/1998 | Ohtsuka | |
| 6,453,404 | B1 | * | 9/2002 | Bereznyi | G06F 12/023 711/119 |
| 6,557,079 | B1 | * | 4/2003 | Mason, Jr. | G06F 12/0862 711/113 |
| 7,039,765 | B1 | * | 5/2006 | Wilkes | G06F 12/0866 711/113 |
| 7,502,881 | B1 | | 3/2009 | Davis | |
| 7,581,042 | B2 | * | 8/2009 | Minturn | G06F 12/0875 710/52 |
| 7,716,425 | B1 | * | 5/2010 | Uysal | G06F 12/0862 711/137 |

(Continued)

OTHER PUBLICATIONS

"Universal Flash Storage (UFS) Unified Memory Extention," JESD220-1, Version 1.0, Sep. 2013, JEDEC Standard, JEDEC Solid State Technology Association, 52 pages.

(Continued)

*Primary Examiner* — Sean D Rossiter
*Assistant Examiner* — Stephanie Wu
(74) *Attorney, Agent, or Firm* — Patterson & Sheridan, LLP; Steven H. Versteeg (57) ABSTRACT

A data storage device may be configured to direct access to at least a portion of a host memory of a host device. For example, the data storage device may store data at the host memory, such as data predicted to be subject to a read request from the host device. When the data storage device receives a read request from the host device to read the data, the data storage device may send an indication to the host device to enable the host device to read the data directly from the host memory.

22 Claims, 4 Drawing Sheets

(56) References Cited

U.S. PATENT DOCUMENTS

| | | | |
|---|---|---|---|
| 7,752,386 B1* | 7/2010 | Aral | G06F 3/0613 711/113 |
| 7,917,702 B2 | 3/2011 | Morrow et al. | |
| 8,560,778 B2 | 10/2013 | Floman et al. | |
| 8,621,121 B1* | 12/2013 | Bappe | G06F 11/1443 710/11 |
| 9,244,843 B1* | 1/2016 | Michels | G06F 12/0817 |
| 2002/0016827 A1* | 2/2002 | McCabe | G06F 11/2058 709/213 |
| 2002/0178238 A1* | 11/2002 | Fletcher | H04L 29/12009 709/220 |
| 2003/0018849 A1* | 1/2003 | Takaichi | G06F 3/0601 711/113 |
| 2004/0205299 A1* | 10/2004 | Bearden | G06F 12/0862 711/137 |
| 2005/0068802 A1* | 3/2005 | Tanaka | G06F 3/0611 365/145 |
| 2005/0228955 A1* | 10/2005 | Day, III | G06F 12/0862 711/137 |
| 2006/0083069 A1* | 4/2006 | Fasoli | G11C 5/04 365/185.19 |
| 2006/0265568 A1* | 11/2006 | Burton | G06F 12/0862 711/216 |
| 2006/0285559 A1 | 12/2006 | Cheng | |
| 2010/0211745 A1* | 8/2010 | Jeddeloh | G06F 1/3203 711/137 |
| 2010/0306421 A1 | 12/2010 | Maeda et al. | |
| 2012/0072698 A1* | 3/2012 | Unesaki | G06F 12/0246 711/207 |
| 2012/0317365 A1* | 12/2012 | Elhamias | G06F 12/0862 711/141 |
| 2013/0013859 A1* | 1/2013 | Zhu | G06F 17/30902 711/118 |
| 2013/0073793 A1 | 3/2013 | Yamagishi et al. | |
| 2013/0198434 A1 | 8/2013 | Mylly et al. | |
| 2013/0198457 A1* | 8/2013 | Kobayashi | G06F 12/0866 711/120 |
| 2013/0268724 A1 | 10/2013 | Seo et al. | |
| 2013/0290647 A1 | 10/2013 | Maeda et al. | |
| 2014/0068196 A1* | 3/2014 | Benoit | H04L 67/2852 711/135 |
| 2015/0039838 A1* | 2/2015 | Tarasuk-Levin | G06F 12/0862 711/137 |
| 2015/0046634 A1 | 2/2015 | Maeda et al. | |

OTHER PUBLICATIONS

"Universal Flash Storage (UFS)," JESD220B (Revision of JESD220A, Jun. 2012), Version 2.0, Sep. 2013, JEDEC Standard, JEDEC Solid State Technology Association, 366 pages.

Non-Final Office Action dated Mar. 8, 2016 in U.S. Appl. No. 14/330,552, 13 pages.

Final Office Action dated Jan. 20, 2017 in U.S. Appl. No. 14/330,552, 9 pages.

* cited by examiner

DEVICE AND METHOD TO STORE PREDICTED DATA AT A HOST MEMORY

FIELD OF THE DISCLOSURE

The present disclosure is generally related to predicted data stored at a host memory.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

In some architectures, a data storage device (e.g., a non-volatile data storage device) may be able to utilize at least a portion of a host memory to store data storage device data, such as cache data or table tracking data, used by the data storage device and/or to store host data received from the host device to be stored at a non-volatile memory of the data storage device. In such architectures, when the data storage device receives, from the host device, a read request associated with the host data stored at the host memory, multiple operations are performed to enable the data storage device to receive the host data from the host memory, to temporarily store the host data at the data storage device, and to provide the host data from the data storage device to the host device to complete execution of the read request. The multiple operations cause unnecessary latency and delay between the host device sending the read request and the host device receiving the data corresponding to the read request from the data storage device.

SUMMARY

A data storage device may be configured to direct (e.g., control) access to at least a portion of a host memory of a host device. For example, the data storage device may store data at the host memory, such as data predicted to be subject to a read request from the host device. When the data storage device receives a read request from the host device to read the data, the data storage device may send an indication (e.g., identifying the location of the data in the host memory) to the host device to enable the host device to read the data directly from the host memory. Accordingly, latency between the host device sending the read request and the host device receiving the data corresponding to the read request may be reduced.

DETAILED DESCRIPTION

Particular embodiments of the present disclosure are described with reference to the drawings. In the description, common features are designated by common reference numbers throughout the drawings.

Figure 1:
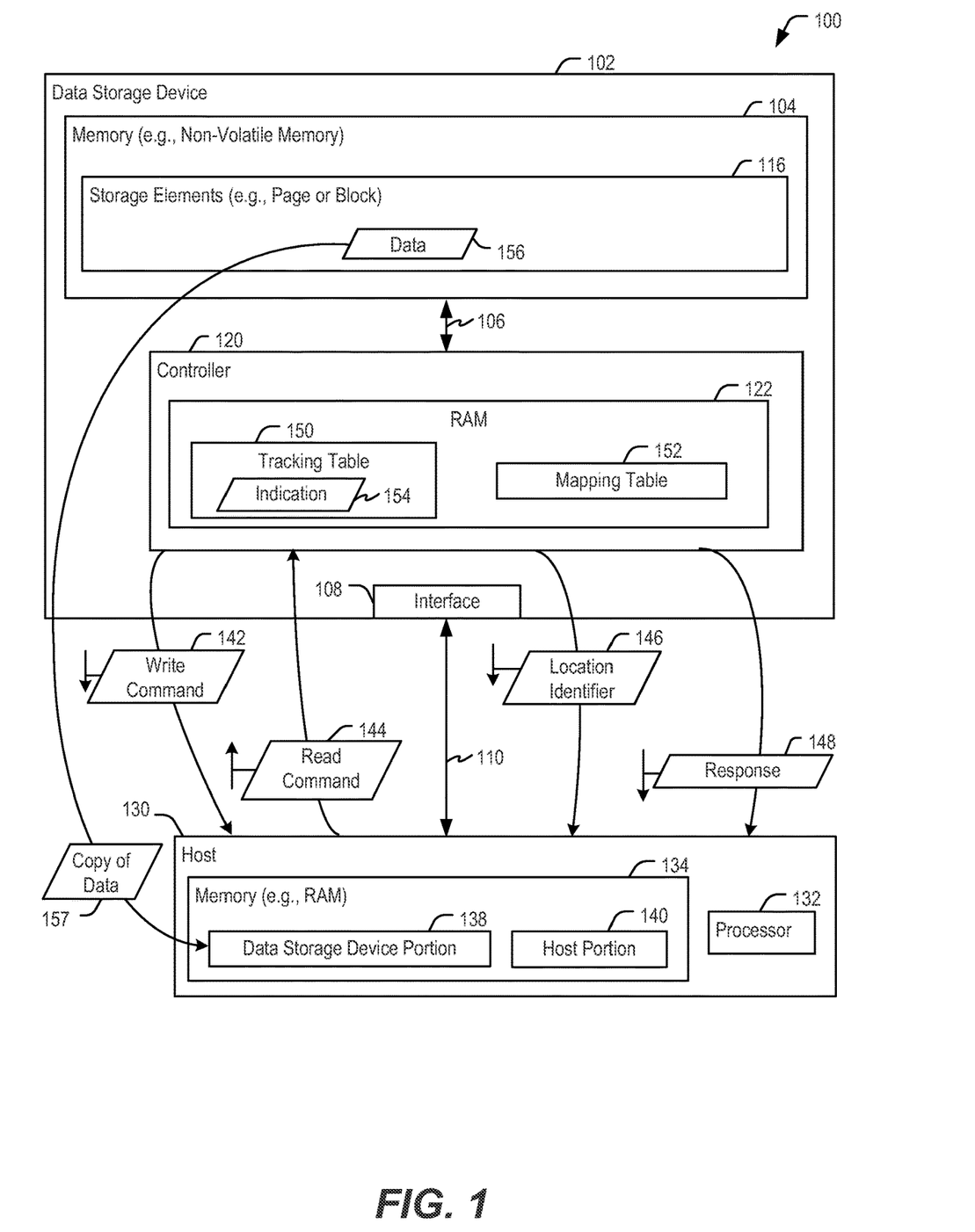
FIG. 1 is a block diagram of a particular illustrative embodiment of a system that enables access to a host memory.

FIG. 1 is a block diagram of a particular illustrative embodiment of a system 100 including a data storage device 102 and a host device 130. The system 100 may be configured to enable the data storage device 102 to direct (e.g., control) access to a data storage device portion 138 of a memory 134 of the host device 130. For example, the system 100 may enable the data storage device 102 to track data stored at the data storage device (DSD) portion 138 and to instruct the host device 130 to read the data directly from the DSD portion 138 based on a read request received at the data storage device 102 from the host device 130.

The data storage device 102 may be embedded within the host device 130, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (i.e., "removably" coupled to) the host device 130. For example, the data storage device 102 may be removably coupled to the host device 130 in accordance with a removable universal serial bus (USB) configuration. In some embodiments, the data storage device 102 may include or correspond to a solid state drive (SSD), which may be used as an embedded storage drive, an enterprise storage drive (ESD), or a cloud storage drive (CSD), as illustrative, non-limiting examples.

The host device 130 may include a processor 132 and a memory 134. The memory 134, such as a random access memory (RAM), may include the data storage device portion 138 (e.g., a DSD portion) and a host portion 140. The host portion 140 may be controlled and/or utilized by the host device 130. For example, the host portion 140 may be available (e.g., utilized) by the processor 132 and/or an operating system (OS) of the host device 130. The DSD portion 138 may be designated for use by the data storage device 102. For example, the DSD portion 138 may be controlled by the data storage device 102 and the host device 130 may be configured to access (e.g., read to or write from) the DSD portion 138 at the direction (e.g., instruction) of the data storage device 102. To illustrate, the DSD portion 138 may logically belong to the data storage 102 as if the DSD portion 138 were a physical memory (e.g., a RAM) of the data storage device 102 and the data storage device 102 may use the DSD portion 138 as a working memory (e.g., a level two physical table cache, a write buffer, etc.) of the data storage device 102.

The data storage device 102 may be coupled to the host device 130 via a communication path 110, such as a wired communication path and/or a wireless communication path. For example, the data storage device 102 may include an interface 108 (e.g., a host interface) that enables communication (via the communication path 110) between the data storage device 102 and the host device 130, such as when the interface 108 is coupled to the host device 130. The host device 130 and the data storage device 102 may communicate with each other (via the communication path 110) using a protocol, such as a universal flash storage (UFS) protocol. For example, the host device 130 and the data storage device 102 may communicate commands and/or messages defined by and/or corresponding to one or more Joint Electron Devices Engineering Council (JEDEC®) (trademark of Joint Electron Devices Engineering Council (JEDEC) Solid State Technology Association, Arlington, Va.) standards.

The data storage device 102 may include a memory 104 coupled to a controller 120. The memory 104, such as a non-volatile memory (e.g., a flash memory), may be coupled to the controller 120 via a bus 106, an interface, another structure, or a combination thereof. The memory 104 may have a three dimensional (3D) memory configuration. Alternatively, the memory 104 may have another memory configuration, such as a two dimensional (2D) memory configuration. The memory 104 may include a plurality of storage elements 116 configured to store data, such as the data 156. The plurality of storage elements 116 may be configured in one or more pages, wordlines, and/or blocks. The plurality of storage elements 116 may be included in a single die or in multiple dies. Although not illustrated in FIG. 1, the memory 104 may include read/write circuitry configured to read data from or write data to storage elements of the memory 104, such as memory cells in the plurality of storage elements 116.

The controller 120 may be configured to issue one or more commands (and/or messages) to the host device 130. Each of the one or more commands (and/or messages) issued to the host device 130 by the data storage device 102 (e.g., the controller 120) may be associated with and/or defined by a protocol used for communication between data storage device 102 and the host device 130. For example, a format of each of the one or more commands may be associated with and/or defined by the protocol. The one or more commands may include an "access DSD portion" command, a "data out" command, a "write" command 142, a "location identifier" message 146, a "response" message, or a combination thereof, as illustrative, non-limiting examples.

The access DSD portion command may instruct the host device 130 to read data stored at the DSD portion 138 and to provide (e.g., send) the data to the data storage device 102. For example, the access DSD portion command may include a pointer (e.g., a DSD portion address) associated with a location of the DSD portion 138, an amount (e.g., a size) of data to be read, or a combination thereof. The access DSD portion command may be issued by the data storage device 102 to retrieve data, such as cache data or table tracking data (e.g., mapping table data associated with a mapping table 152), from the DSD portion 138 that is to be processed by the controller 120.

The data storage device 102 may send the data out command to provide the host device 130 with data read from the memory 104 of the data storage device 102. For example, the data storage device 102 may send the data out based on a read request received from the host device 130, such as a read command 144 received from the host device 130, as described further herein.

The write command 142 may instruct the host device 130 to write data, such as the data 156, a copy of data 157 (e.g., a copy of the data 156), cache data, and/or tracking data, to the DSD portion 138 of the memory 134 of the host device 130. The write command 142 may include the data, such as the data 156 or the copy of data 157, to be written to the DSD portion 138, an indication of a location (e.g., a DSD portion address) of the DSD portion 138, or a combination thereof.

In some embodiments, the data storage device 102 may send the write command 142 based on identification of predicted data, such as data stored at the memory 104 that is likely (e.g., probable) to be requested by the host device 130. For example, when the data 156 is identified as predicted data, the data storage device 102 may send the copy of data 157 (e.g., a copy of the data 156) to the DSD portion 138. The controller 120 may identify the predicted data responsive to a "read ahead" command (e.g., a "pre-fetch" command) received from the host device 130 that indicates a logical address or a location of the memory 104 where the predicted data is stored. Alternatively or additionally, the controller 120 may identify the predicted data based on tracking read requests received from the host device 130 and determining (e.g., identifying) a pattern or sequence of the read requests. For example, the controller 120 may identify a particular sequence of read requests in which a first read request (e.g., to read a first logical address or a first location of the memory 104) is followed by a second read request (e.g., to read a second logical address or a second location of the memory 104). Accordingly, when the data storage device 102 receives the first read request of the particular sequence of read requests, the controller 120 may identify the data stored at the second location of the memory as predicted data. The controller 120 may generate a particular write command that includes the data from the second location and may send the particular write command to the host device 130 prior to receiving the second read request of the particular sequence of read requests.

The data storage device 102 may send the location identifier message 146 to the host device 130 to enable the host device 130 to read data, such as the data 156 or the copy of data 157, from the DSD portion 138 of the memory 134. For example, the data storage device 102 may send the location identifier message 146 to the host device 130 based on a read request (e.g., such as the read command 144) received from the host device 130. To illustrate, when the read request is associated with data stored at the memory 104 that the controller 120 identified as predicted data and stored to the DSD portion 138, the controller 120 may send the location identifier message 146 to enable the host device 130 to directly access the data (e.g., the predicted data) from the DSD portion 138. The location identifier message 146 may include a pointer that indicates a location (e.g., a DSD portion address) of the DSD portion 138, the DSD portion address of the DSD portion 138, an amount (e.g., a size) of data to be read from the DSD portion 138, or a combination thereof. The location identifier message 146 may also enable the host device 130 to process the data read from the DSD portion 138 without sending the data read from the DSD portion 138 to the data storage device 102 prior to processing the data.

The data storage device 102 may send the response message 148 to the host device 130 to indicate a completion of a read request (e.g., the read command 144) received from the host device 130. For example, based on a particular read request received from the host device 130, the data storage device 102 may send one or more location identifier messages, one or more data out commands, or a combination thereof, to satisfy the particular read request. After the data storage device 102 completes (e.g. satisfies) the particular read request, the data storage device 102 (e.g., the controller 120) may send the response message 148 that indicates the data storage device 102 completed execution of the particular read request.

The controller 120 may include a random access memory (RAM) 122. The RAM 122, such as a volatile memory, may be configured to store a tracking table 150, a mapping table 152, or a combination thereof. The mapping table 152 may include a logical to physical mapping table. For example, the controller 120 may use the mapping table 152 to map one or more logical addresses (e.g., a range of logical block address) received from the host device 130 to one or more physical addresses that correspond to storage locations of the memory 104. The controller 120 may update the mapping table 152 as data is written to and/or erased from the memory 104.

The tracking table 150 may be configured to track data stored at one or more storage locations (e.g., DSD portion addresses) of the DSD portion 138 of the memory 134 of the host device 130. The controller 120 may update the tracking table 150 to reflect the data stored at DSD portion 138. To illustrate, when the controller 120 stores the data 156 or the copy of data 157 (e.g., a copy of the data 156) at the DSD portion 138 of the memory 134, the controller 120 may generate an indicator 154. The indicator 154 may be included in or correspond to an entry in the tracking table 150. The indicator 154 may include a logical address that corresponds to the data 156 (or a copy thereof) stored at the memory 104, a physical address that correspond to the data 156 (or a copy thereof) stored at the memory 104, a DSD portion address that corresponds to the data 156 (or a copy thereof) stored at the DSD portion 138 of the memory 134, an amount of the data 156 (or a copy thereof) stored at the DSD portion 138, or a combination thereof, as illustrative, non-limiting examples.

As another example, the controller 120 may store first data at storage elements corresponding to a first DSD portion address of the DSD portion 138. Accordingly, the controller 120 may update the tracking table 150 to include a first indicator that indicates that the first data is stored at the first DSD portion address. As another example, the controller 120 may store second data at storage elements corresponding to a second DSD portion address of the DSD portion 138. Accordingly, the controller 120 may update the tracking table 150 to include a second indicator that indicates that the second data is stored at the second DSD portion address.

The controller 120 may be configured to receive data and commands (e.g., instructions) from the host device 130 and may access the memory 104 based on the received commands. The controller 120 may send one or more write requests to the memory 104 to store the data to a specified address of the memory 104. The write request may specify a physical address of a portion of the memory 104 (e.g., a physical address of a word line of the memory 104) that is to store the data. The controller 120 may be configured to send a read request to the memory 104 to access data from a specified address of the memory 104. To illustrate, the controller 120 may send a read request to access the data stored in the memory 104. The read request may specify the physical address of a portion of the memory 104 (e.g., a physical address of a word line storing the data).

The controller 120 may be configured to receive one or more commands (and/or messages) from the host device 130. Each of the one or more commands (and/or messages) received at the data storage device 102 from the host device 130 may be associated with and/or defined by the protocol used for communication between data storage device 102 and the host device 130. For example, a format of each of the one or more commands may be associated with and/or defined by the protocol. The one or more commands sent by the host device 130 and received by the data storage device 102 (e.g., the controller 120) may include a "write" command (e.g., a write request), a "read ahead" command (e.g., a "pre-fetch" command), a "read" command 144 (e.g., the read request), a "data out" command, an "Acknowledge" message, or a combination thereof, as illustrative, non-limiting examples.

The write command (e.g., a write instruction) may instruct the controller 120 to write data to a location of the memory 104. For example, the write command received from the host device 130 may include a small computer system interface (SCSI) write command. To illustrate, a particular write command may instruct the controller 120 to store the data 156 at a location of the memory 104.

The read ahead command (e.g., the pre-fetch command) may indicate that host device 130 intends to request particular data, such as the data 156, from the data storage device 102. For example, the read ahead command may indicate one or more logical block addresses, an amount of data to be read, or a combination thereof. Based on the read ahead command, the controller 120 may identify data associated with the read ahead command as predicted data and may send the write command 142 to cause the host device 130 to store the predicted data (or a copy thereof) at the DSD portion 138.

The read command 144 (e.g., a read instruction) may instruct the controller 120 to read data from a location of the memory 104. For example, the read command 144 received from the host device 130 may include a small computer system interface (SCSI) read command. To illustrate, the read command 144 may instruct the data storage device 204 to read the data 156 from the memory 104. The read command 144 may include (e.g. identify) one or more logical addresses (e.g., a range of logical block address), an amount (e.g., size) of data to read, or a combination thereof.

The data out command may provide the data storage device 102 with data (e.g., mapping table data) read from the DSD portion 138 of the memory 134 of the host device 130. The data out command may be responsive to and/or correspond to the access DSD portion command sent by the data storage device 102.

An acknowledge message (e.g., the acknowledgement command) may indicate that the host device 130 read data from a location the DSD portion 138 based on the location identifier message 146 issued by the data storage device 102. The acknowledge message, when received by the controller 120, may indicate that the location (e.g., a DSD portion address) of the DSD portion 138 is available, such that the controller 120 may store different data at the location.

During operation, the data storage device 102 may receive a write command from the host device 130 to write the data 156 to a location (e.g. a storage location) of the memory 104. After storing the data 156 at the memory 104, the controller 120 may update the mapping table 152 based on the location of the data 156 in the memory 104.

After storing the data 156 at the memory 104, the controller 120 may identify the data 156 as predicted data, such as read ahead data or pre-fetch data. Based on identification of the data 156 as the predicted data, the controller 120 may send the write command 142 to the host device 130. The write command 142 may instruct the host device 130 to write the data 156 or the copy of data 157 (e.g., a copy of the data 156) to the DSD portion 138 of the memory 134 (e.g., a host RAM). In addition to sending the write command 142 to the host device 130, the controller 120 may generate the indicator 154 and may store the indicator 154 in the tracking table 150. The indicator 154 may indicate a location of the DSD portion 138 where the data 156 (or the copy of data 157) is stored.

After sending the write command 142 to the host device 130, the data storage device 102 may receive the read command 144 (e.g., a read request) from the host device 130 to read the data 156 from the memory 104, such as when the prediction by the controller 120 (that the data 156 is to be accessed) is correct. For example, the read command 144 may include a logical address associated with the data 156 in the memory 104 to be read by the data storage device 102. The controller 120 may use the mapping table 152 to identify a physical address of the data 156 based on the logical address indicated by the read command 144. Based on the physical address and/or the logical address, the controller 120 may use the tracking table 150 to determine whether the data 156 (or a copy thereof, such as the copy of data 157) is stored at the DSD portion 138 of the host device 130. Based on a determination that the data 156 (or a copy thereof) is stored at the DSD portion 138, the controller 120 may determine a location (e.g., a DSD portion address associated with the data 156) of the data 156 (or a copy thereof) in the DSD portion 138 and may send the location identifier message 146 to the host device 130.

After sending the location identifier message 146, the data storage device 102 may send the response message 148 to the host device 130 that the data storage device 102 completed execution of the read command 144. Subsequent to sending the location identifier message 146 and/or the response message 148, the data storage device 102 may receive the acknowledge message from the host device 130. The acknowledge message may indicate to the data storage device 102 that the host device 130 accessed (e.g., read) the data 156 (or the copy thereof) from the DSD portion 138. Responsive to the acknowledge message, the controller 120 may update the tracking table 150 to indicate that the location (e.g., the DSD portion address) of the DSD portion 138 corresponding to the data 156 (or the copy thereof) is available to store different data (e.g., the data 156 is no longer predicted to be requested and so may no longer be maintained at the DSD portion 138).

In some embodiments, the data storage device 102 may not receive the acknowledge message from the host device 130. For example, the host device 130 may not be configured to send the acknowledge message after accessing the data 156 (or the copy thereof) from the DSD portion 138. In such embodiments, the data storage device 102 may assume that the host device 130 accessed the data 156 (or the copy thereof) in response to the location identifier message 146. Accordingly, after sending the location identifier message 146, the controller 120 may update the tracking table 150 to indicate that the DSD portion address corresponding to the data 156 is available to store new data. To illustrate, the controller 120 may wait for a predetermined time period after sending the location identifier message 146 before indicating that the DSD portion address is available.

In some embodiments, the controller 120 may maintain particular data (e.g., predicted data) at the DSD portion 138 based on a threshold. For example, the threshold may be a threshold amount of time (e.g., a number of clock cycles) or a threshold number of operations or request (associated with access to the memory 104). The threshold amount of time may be a total amount of time that the particular data is stored at the DSD portion 138. The controller 120 may maintain the particular data at the DSD portion 138 based on tracking data included in the tracking table 150. To illustrate, a particular DSD portion address indicated by the tracking table 150 as storing predicted data may be changed to an available status (to store new data) when the threshold is satisfied (e.g., when an amount of time that the particular data is stored at the DSD portion 138 is equal to or exceeds the threshold amount of time). For example, when the threshold is satisfied, the controller 120 may update the tracking table 150 to indicate that the particular DSD portion address is available to store new data (e.g., different data). As another example, the controller 120 may remove an entry of the tracking table 150 that corresponds to the DSD portion address when the threshold is satisfied.

Although the host device 130 is illustrated as including a single memory (e.g., the memory 134), the host device 130 may include one or more additional memories. The memory 134 and/or the one or more additional memories may be configured to store data and/or instructions that may be executable by the processor 132. Additionally, the memory 134 may be a single memory or may include one or more memories, such as one or more non-volatile memories, one or more volatile memories, or a combination thereof. In some embodiments, the memory 134 may be dedicated to the data storage device 102 and may not include the host portion 140.

Although the tracking table 150 and the mapping table 152 are illustrated as separate tables, in other embodiments the tracking table 150 and the mapping table 152 may be combined into a single table. For example, a particular entry of the mapping table 152 that maps a particular logical address to a particular physical address of the memory 104 may also identify a particular DSD portion address of the DSD portion 138 when particular data stored at the particular physical address is to be stored (or is stored) at the particular DSD portion address. To illustrate, the controller 120 may generate a particular indicator, such as the indicator 154, corresponding to the particular data being stored at the particular DSD portion address and may update the particular entry to include the particular indicator. The particular indicator may identify the particular DSD portion address of the DSD portion 138 of the memory 134. Accordingly, when the data storage device 102 receives a read request (e.g., a Read Command) from the host device 130 that identifies the particular logical address, the data storage device 102 may access the particular entry of the mapping table 152 and, based on the particular indicator, identify the particular DSD portion address of the DSD portion 138.

Additionally or alternatively, although the tracking table 150 and the mapping table 152 are illustrated as being stored at the RAM 122 included in the controller 120, in other implementations the tracking table 150 and/or the mapping table 152 may be stored at the memory 104, at the memory 134 (e.g., the DSD portion 138), at another memory that is coupled to the controller 120, or a combination thereof. Additionally or alternatively, the controller 120 may include a single memory component, such as the RAM 122 or may include multiple distinct memory components and/or multiple different types of memory components.

Additionally, the data storage device 102 may include an error correction code (ECC) engine (not shown). The ECC engine may be configured to receive data, such as the data 156, and to generate one or more error correction code (ECC) codewords (e.g., including a data portion and a parity portion) based on the data. For example, the ECC engine may include an encoder configured to encode the data using an ECC encoding technique. The ECC engine may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine may include a decoder configured to decode data read from the memory 104 to detect and correct bit errors that may be present in the data. For example, the ECC engine may correct a number of bit errors up to an error correction capability of an ECC technique used by the ECC engine. A number of errors identified by the ECC engine may be tracked by the controller 120, such as by the ECC engine. For example, based on the number of errors, the ECC engine may determine a bit error rate (BER) associated with one or more blocks of the memory 104.

In some embodiments, the data 156 stored at the non-volatile memory may include or correspond to a codeword having a data portion and a parity portion. The copy of data 157 sent to the DSD portion 138 of the host memory 134 may include or correspond to an error-corrected version of the data portion of the codeword (e.g., the data 156). For example, the copy of data 157 may not include the parity portion of the codeword (e.g., the data 156).

By enabling the data storage device 102 to instruct the host device 130 to read the data directly from the DSD portion 138 (e.g., the host RAM), the data storage device 102 may advantageously store data, such as predicted data (e.g., read ahead data or pre-fetched data) at the DSD portion 138. Storing the data (e.g., predicted data) at the DSD portion 138 may enable the data storage device 102 to quickly provide the data to the host device 130 responsive to the read command 144 that requests the data. For example, the data storage device 102 may avoid having multiple operations to provide the data to the host device 130, which may reduce latency and reduce delay associated with providing the data to the host device 130. Additionally, by receiving the acknowledge message from the host device 130, the data storage device 102 may determine that it is no longer necessary to keep the data at the DSD portion 138. Accordingly, the data storage device 102 may update the tracking table 150 based on the acknowledge message and may maintain (e.g., track) available storage space (e.g., available storage locations) at the DSD portion 138.

Figure 2:
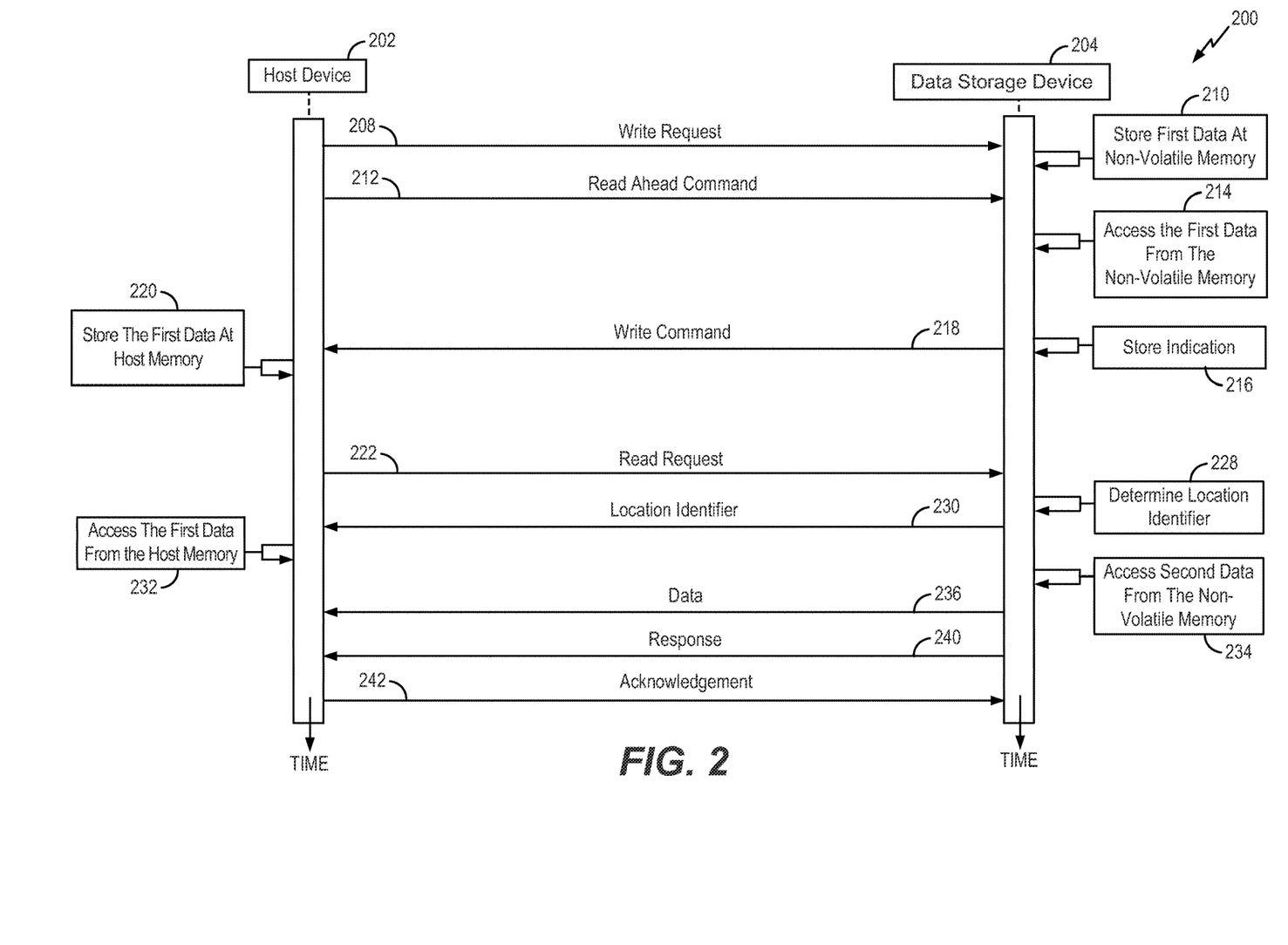
FIG. 2 is a ladder diagram illustrating operations to enable access to a host memory.

Referring to FIG. 2, a first illustrative embodiment of a method 200 of communicating between a representative host device 202 and a representative data storage device 204 is shown. The method 200 is illustrated by a ladder diagram. The method 200 may be used to enable access to a host memory where a portion of the host memory is controlled by the data storage device 204 and the host device 202 may be configured to access (e.g., read to or write from) the portion at the direction (e.g., instruction) of the data storage device 204. For example, the host device 202 and the data storage device 204 may include or correspond to the host device 130 and the data storage device 102 of FIG. 1, respectively.

The host device 202 may send, to the data storage device 204, a write request (e.g., a write command) that instructs the data storage device 204 to write first data to a non-volatile memory of the data storage device 204, at 208. The write request may include the first data, such as the data 156 of FIG. 1. The write request may be a small computer system interface (SCSI) write command. The non-volatile memory of the data storage device 204 may include or correspond to the memory 104 of FIG. 1.

Based on the write request, the data storage device 204 may store the first data at the non-volatile memory of the data storage device 204, at 210. For example, the data storage device 204 may store the first data at a location corresponding to a first address (e.g., a first physical address) of the non-volatile memory. The data storage device 204 may update a mapping table, such as a logical to physical mapping table, based on the first address. For example, the mapping table may include or correspond to the mapping table 152 of FIG. 1. The mapping table may be stored at the non-volatile memory of the data storage device 204, at a random access memory (RAM) of the data storage device 204, such as the RAM 122 of FIG. 1, at a memory (e.g., a RAM) of the host device 202, such as the memory 134 of FIG. 1, or a combination thereof.

The host device 202 may send a read ahead command to the data storage device 204, at 212. The read ahead command (and/or a pre-fetch command) may indicate that host device 202 intends to request the first data from the data storage device 204. For example, the read ahead command may indicate one or more logical block addresses, an amount of data that may be read, or a combination thereof. Based on the read ahead command, the data storage device 204 may determine that the host device 202 may (e.g., is likely to) send a read request associated with the first data.

Based on the read ahead command, the data storage device 204 may identify the first data as predicted data and may access (e.g., read) the first data from the non-volatile memory, at 214. For example, the data storage device 204 may read the first data from the location (corresponding to the first physical address) of the non-volatile memory and may generate a copy of the first data.

The data storage device 204 may send a write command to the host device 202, at 218. The write command, such as the write command 142 of FIG. 1, sent by the data storage device 204 may instruct the host device 202 to write the first data (or the copy of the first data) to a portion (e.g., a DSD portion) of a memory of the host device 202. The portion of the memory of the host device 202 may include or correspond to the DSD portion 138 of the host device 130 of FIG. 1. Additionally, the data storage device 204 may generate and store an indicator at a tracking table, at 216, to identify an available location of the portion of the memory of the host device 202. The indicator stored at the tracking table may include or correspond to the indicator 154 stored at the tracking table 150 of FIG. 1. To illustrate, after accessing the first data from the non-volatile memory, the data storage device 204 may identify the available location (e.g., an address) of the portion of the memory of the host device 202. The write command may include the first data (or a copy thereof) read from the non-volatile memory, a location indication (e.g., an address) associated with the available location, or a combination thereof. After sending the write command, the data storage device 204 may update the tracking table to reflect the first data (or a copy thereof) being stored at the available location of the portion of the memory of the host device 202. The indication may be generated and/or stored prior to, during, or after the write command is sent to the host device 202, at 218.

The host device 202 may store the first data (or a copy thereof) at the portion of the memory of the host device 202, at 220. For example, the host device 202 may store the first data (e.g., a copy of the first data) at a location of the portion responsive to the write command.

The host device 202 may send a read request (e.g., a read command) to the data storage device 204, at 222. For example, the read request may include or correspond to the read command 144 of FIG. 1. The read request may be a small computer system interface (SCSI) read command. The read command may instruct the data storage device 204 to read at least the first data from the non-volatile memory of the data storage device 204. For example, the read request may include (e.g. identify) one or more logical addresses (e.g., a range of logical block address), an amount of data to read, or a combination thereof.

Based on the read request that identifies the one or more logical addresses, the data storage device 204 may determine one or more physical addresses of the non-volatile memory of the data storage device 204 to be read. For example, the data storage device 204 may determine the one or more physical addresses using the mapping table. The data storage device 204 may store the mapping table at the data storage device 204 and may use the mapping table to identify the one or more physical addresses of the non-volatile memory of the data storage device 204. In the event that a portion of the mapping table corresponding to the first data is stored in the portion of the memory of the host device 202, the data storage device 204 may send an access command, such as an access DSD portion command, to the host device 202 to retrieve the portion of the mapping table from the memory of host device 202.

The data storage device 204 may determine, based on the one or more physical addresses, a location identifier (e.g., an address of a data location in the portion of the memory of the host device 202) to be read responsive to the read request received from the host device 202, at 228. For each of the one or more physical addresses, the data storage device 204 may determine whether the physical address is associated with data stored at the host device 202. For example, the data storage device 204 may use the tracking table to determine whether data corresponding to a particular physical address of the non-volatile memory of the data storage device 204 is stored at the portion of the memory of the host device 202. To illustrate, the one or more physical addresses may include the first physical address and a second physical address. Based on the first physical address and the tracking table, the data storage device 204 may determine that the first data (or a copy thereof) is stored at the portion of the memory of the host device 202 and may identify the address of the data location in the portion of the memory of the host device 202 where the first data (or a copy thereof) is stored. Based on the second physical address and the tracking table, the data storage device 204 may determine that second data (corresponding to the second physical address) is not stored at the portion of the memory of the host device 202. Although the one or more physical addresses is described as including two physical addresses, in other embodiments the one or more physical addresses may include a single physical address or more than two physical addresses.

Based on the first physical address, the data storage device 204 may send a location identifier message to the host device 202, at 230. The location identifier message may include or correspond to the location identifier command 146 of FIG. 1. The location identifier message may enable the host device 202 to read, based on the address, the first data (e.g., the copy of the first data) from the portion of the memory of the host device 202. For example, the location identifier message may include the address of the data location in the portion of the memory of the host device 202, a pointer that indicates the address of the data location in the portion of the memory of the host device 202, an amount (e.g., a size) of data to be read from the portion of the memory of the host device, or a combination thereof. The location identifier message may also enable the host device 202 to process the first data (or a copy thereof) without sending the first data read from the portion of the memory of the host device 202 to the data storage device 204 prior to processing the first data.

Based on the location identifier message, the host device 202 may read the first data (e.g., the copy of the first data) from the portion of the memory of the host device 202, at 232. For example, the host device 202 may identify the pointer included in the location identifier command that indicates the location of the portion of the memory of the host device 202, a size of the data to be read from the portion of the memory of the host device 202, or a combination thereof. The host device 202 may read the address of the data location in the portion of the memory of the host device 202 and may provide the first data (e.g., the copy of the first data) read from the portion of the memory of the host device 202 to a processor of the host device 202, such as the processor 132 of the host device 130 of FIG. 1.

Based on the second physical address, the data storage device 204 may access (e.g., read the second data from) the second physical address of the non-volatile memory of the data storage device 204, at 234. The data storage device 204 may transfer data (e.g., the second data) to the host device 202, at 236. For example, the data storage device 204 may transfer (e.g., send) the second data to the host device 202 using a data out command.

The data storage device 204 may send a response to the host device 202, at 240. The response may indicate that the data storage device 204 completed execution of the read request. For example, the response may include or correspond to the response message 148 of FIG. 1.

The host device 202 may send an acknowledgement message to the data storage device 204, at 242. The acknowledgement message may indicate that the host device 202 read the first data (e.g., the copy of the first data) and that the address (e.g., a location) of the portion of the memory of the host device 202 as available. The acknowledgement message may be responsive to the location identifier message (associated with the first data) sent from the data storage device 204 to the host device 202.

Although the data storage device 204 is described as accessing the first data, at 214, responsive to the read ahead command received from the host device 202, in other embodiments the data storage device 204 may access the first data without receiving the read ahead command. For example, data storage device 204 may use a pattern and/or a sequence of the read requests to identify the first data as predicted data and may access the first data based on a determination that the data is predicted data.

By communicating the location identifier message from the data storage device 204 to the host device 202, the host device 202 may be enabled to (directly) access the first data (or a copy of the first data) stored at the portion of the memory of the host device 202. Additionally, by communicating the acknowledgement message from the host device 202 to the data storage device 204, the data storage device 204 may verify that the host device 202 received the first data (or a copy thereof) and may determine that the first data (or the copy thereof) stored at the portion of the memory of the host device 202 in no longer needed and can be replaced (e.g., overwritten).

Figure 3:
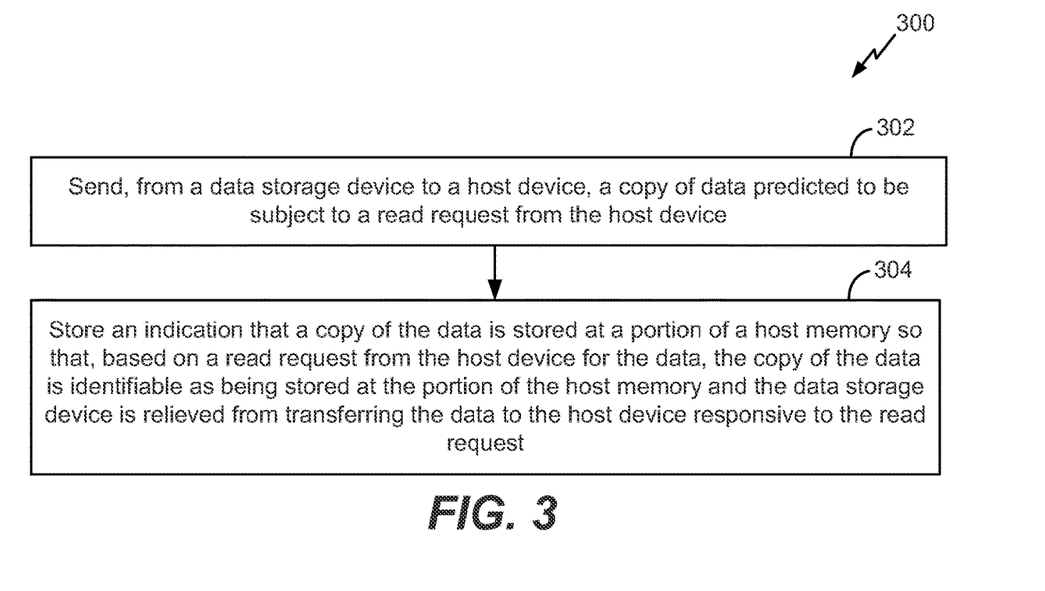
FIG. 3 is a flow diagram of an illustrative embodiment of a method to enable access to a host memory.

Referring to FIG. 3, an illustrative embodiment of a method 300 to enable access to a host memory is shown. For example, the method 300 may be performed by a controller of the data storage device, such as by the controller 120 of the data storage device 102 of FIG. 1 or a controller of the data storage device 204 of FIG. 2. The host memory may include or correspond to the memory 134 of FIG. 1 and/or a memory of the host device 202 of FIG. 2. In some embodiments, the host memory may include a random access memory (RAM).

The method 300 includes sending, from the data storage device to a host device, a copy of data predicted to be subject to a read request from the host device, at 302. For example, the host device may include or correspond to the host device 130 of FIG. 1 and/or the host device 202 of FIG. 2. The data may be sent to the host device along with an instruction directing the host device to store the data a portion of the host memory. For example, the data may be sent as part of a write command, such as the write command 142 of FIG. 1. The data and the copy may include or correspond to the data 156 and the copy of data 157 of FIG. 1.

Prior to sending the copy of the data to the host device, the data storage device (e.g., a controller of the data storage device) may store the data at a non-volatile memory, such as the memory 104, of the data storage device. Subsequent to the data being stored at the non-volatile memory, the data may be identified as predicted data (e.g., read ahead data or pre-fetch data) and the copy of the data may be sent to the host device in response to the data being identified as the predicted data.

The method 300 also includes storing an indication that a copy of the data is stored at a portion of the host memory so that, based on a read request form the host device for the data, the copy of the data is identifiable as being stored at the portion of the host memory and the data storage device is relieved from transferring the data to the host device responsive to the read request, at 304. The indication is stored in a tracking table that corresponds to the portion of the host memory. For example, the data storage device may store the indication at a non-volatile memory of the data storage device, at a random access memory (RAM) of the data storage device, or at the portion of the host memory. The tracking table may be maintained by the data storage device. The indication may include or correspond to the indicator 154 of FIG. 1. The portion of the host memory may include or correspond to the DSD portion 138 of the memory 134 of FIG. 1. The read command may include or correspond to the read command 144 of FIG. 1.

After storing the indication, the data storage device may receive, from the host device, a read request to read the data from the non-volatile memory. In response to the read request, the data storage device may determine a location identifier based on the stored indication. The location identifier may be associated with a location of the host memory that stores the copy of the data. The data storage device may send the location identifier to the host device to enable the host device to read the data (e.g., the copy of the data) directly from the host memory.

The method 300 may enable the data storage device to track data (e.g., a copy of the data) stored at the portion of the host memory and based on a read request received from the host device for the data, the data storage device may use the indicator to determine that the data (or a copy thereof) is stored at the host memory. Accordingly, the data storage device may be able to enable the host device to (directly) access the data (e.g., the copy of the data) stored at the host memory without have to transfer the data (or the copy thereof) from the data storage device to the host device responsive to the read request.

Figure 4:
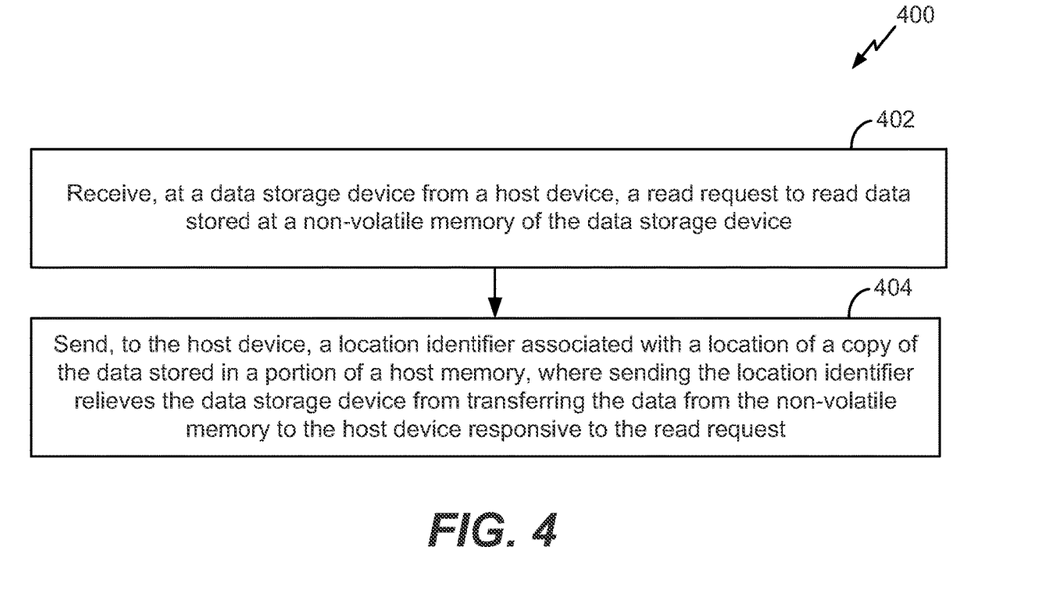
FIG. 4 is a flow diagram of an illustrative embodiment of another method to enable access to a host memory.

Referring to FIG. 4, an illustrative embodiment of a method 400 to enable access to a host memory is shown. For example, the method 400 may be performed by a controller of the data storage device, such as by the controller 120 of the data storage device 102 of FIG. 1 or a controller of the data storage device 204 of FIG. 2. The host memory may include or correspond to the memory 134 of FIG. 1 and/or a memory of the host device 202 of FIG. 2.

The method 400 includes receiving, at the data storage device from a host device, a read request to read data stored at a non-volatile memory of the data storage device, at 402. The data and the non-volatile memory may include or correspond to the data 156 and the memory 104 of FIG. 1, respectively. The read request may include or correspond to the read command 144 of FIG. 1. In response to the read request, the data storage device (e.g., a controller of the data storage device) may determine whether the data (or a copy thereof) is stored at the host memory of the host device. For example, the data (or a copy thereof) may have been sent to the host device to be stored at a portion of the host memory prior to receiving the read request. To illustrate, prior to receiving the read request, the data (or a copy thereof) may be sent to the host device to be written to the portion of the host memory. The portion of the host memory may include or correspond to the DSD portion 138 of the memory 134 of FIG. 1.

The method 400 further includes sending, to the host device, a location identifier associated with a location of a copy of the data stored in a portion of the host memory, where sending the location identifier relieves the data storage device from transferring the data from the non-volatile memory to the host device responsive to the read request, at 404. The copy of the data may include or correspond to the copy of data 157 of FIG. 1. The location sent to the host device may enable the host device to read the data (e.g., the copy of the data) directly from the location of the host memory. The location identifier sent to the host device may include or correspond to the location identifier message 146 of FIG. 1. The portion of the host memory may include or correspond to the DSD portion 138 of the memory 134 of FIG. 1.

After sending the location identifier, the data storage device may send a response message to the host device indicating that the data storage device completed execution of the read request. The data storage device may send the response message without sending the data to the host device responsive to the read request. Alternatively, or in addition, the data storage device may receive an acknowledgement message from the host device that indicates that the host device accessed the data (e.g., the copy of the data) from the portion of the host memory.

The method 400 may enable the host device to (directly) access the data (or a copy thereof) stored at the portion of the host memory of the host device. Accordingly, the data storage device may store the data (or a copy thereof), such as predicted data (e.g., read ahead data or pre-fetch data) at the portion of the host memory without increasing a latency associated with providing the data to the host device responsive to the read request. Additionally, by storing the data (or a copy thereof) at the portion of the host memory, the data storage device may be relieved from transferring the data to the host device responsive to the read request.

Figure 5:
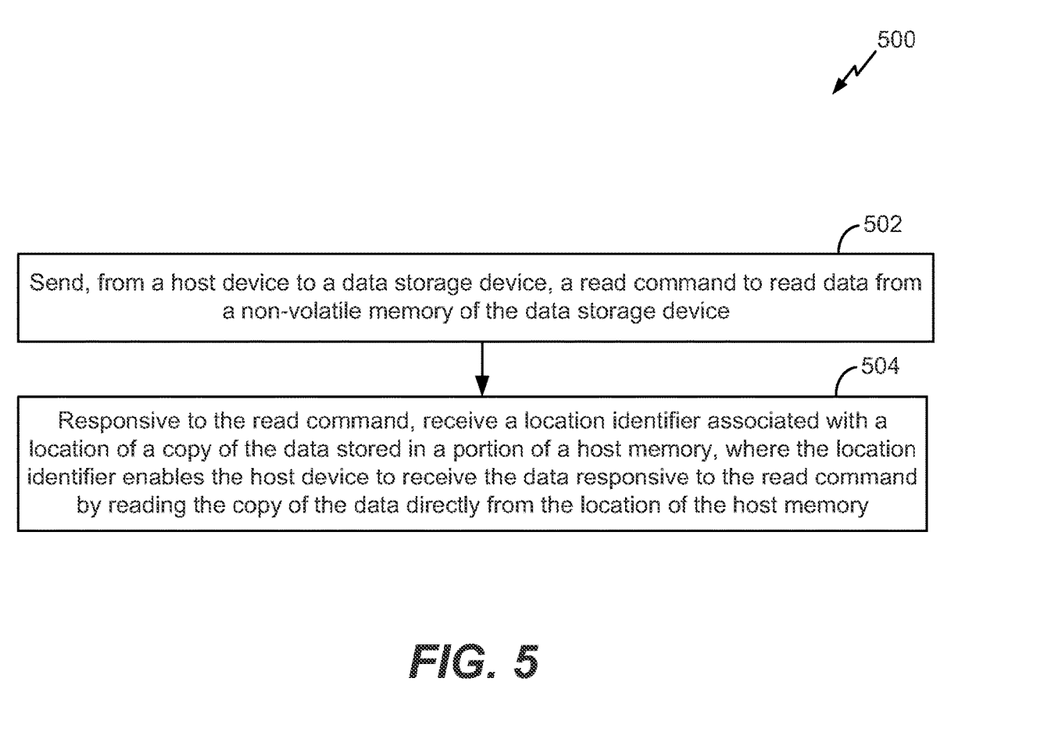
FIG. 5 is a flow diagram of an illustrative embodiment of another method to enable access to host memory.

Referring to FIG. 5, an illustrative embodiment of a method 500 to enable access to a host memory is shown. For example, the method 500 may be performed by a controller of the data storage device, such as by the controller 120 of the data storage device 102 of FIG. 1 or a controller of the data storage device 204 of FIG. 2. The host memory may include or correspond to the memory 134 of FIG. 1 and/or a memory of the host device 202 of FIG. 2. In some embodiments, the host memory may include a random access memory (RAM).

The method 500 includes sending, from a host device to the data storage device, a read command to read data from a non-volatile memory of the data storage device, at 502. The read command may include or correspond to the read command 144 of FIG. 1. The read command may include a small computer system interface (SCSI) read command. The read command may include a logical address that corresponds to a physical address of the non-volatile memory that stores the data. The data stored in the non-volatile memory may include or correspond to the data 156 of the non-volatile memory 104 of FIG. 1. Prior to sending the read command, the host device may have sent a write command to the data storage device instructing the data storage device to store the data at the non-volatile memory. The non-volatile memory of the data storage device may include or correspond to the non-volatile memory 104 of the data storage device 102 of FIG. 1 or a non-volatile memory of the data storage device 204 of FIG. 2.

The method 500 also includes, responsive to the read command, receiving a location identifier associated with a location of a copy of the data stored in a portion of the host memory, where the location identifier enables the host device to receive the data responsive to the read command by reading the data directly from the location of the host memory, at 504. The location identifier may include or correspond to the location identifier message 146 of FIG. 1. The portion of the host memory may include or correspond to the DSD portion 138 of the memory 134 of FIG. 1. The location identifier may include an address of a data location in the portion of the host memory, a pointer that indicates the address of the data location in the portion of the host memory, an amount (e.g., a size) of data to be read from the portion of the host memory, or a combination thereof. The location identifier may enable the host device to directly access the data (e.g., the copy of the data) from the portion of the host memory. For example, based on the location identifier, the host device may read the data (or a copy thereof) from a location of the host memory that stores the data (or the copy thereof). Accordingly, the location identifier may enable the host device to read the data (e.g., the copy of the data) from the portion of the host memory to complete execution of the read command without sending the data (or the copy of the data) read from the portion of the host memory to the data storage device after the host device reads the data (or the copy of the data) from the portion of the host memory.

In some embodiments, prior to sending the read command, the host device may receive an instruction from the data storage device to perform a write operation at the portion of the host memory. For example, the instruction may include the data (or a copy thereof) and instruct the host device to store the data (or the copy thereof) at the portion of the host memory.

The method 500 may enable the host device to (directly) access the data stored at the portion of the host memory of the host device. Accordingly, the data storage device may store the data, such as predicted data (e.g., read ahead data or pre-fetch data) at the portion of the host memory of the host device without increasing a latency associated with providing the data to the host device responsive to the read request.

The method 200 of FIG. 2, the method 300 of FIG. 3, the method 400 of FIG. 4, and/or the method 500 of FIG. 5 may be initiated or controlled by an application-specific integrated circuit (ASIC), a processing unit, such as a central processing unit (CPU), a digital signal processor (DSP), a controller, another hardware device, a firmware device, a field-programmable gate array (FPGA) device, or any combination thereof. As an example, the method 200 of FIG. 2, the method 300 of FIG. 3, the method 400 of FIG. 4, and/or the method 500 of FIG. 5 can be initiated or controlled by one or more processors included in or coupled to the data storage device 102 of FIG. 1, such as one or more processors included in or coupled to the controller 120 of FIG. 1, one or more processors included in or coupled to the host device 130 (e.g., the processor 132) of FIG. 1, and/or one or more processors included in or coupled to the host device 202 or the data storage device 204 of FIG. 2.

A controller configured to perform the method 200 of FIG. 2, the method 300 of FIG. 3, the method 400 of FIG. 4, and/or the method 500 of FIG. 5 may be able to advantageously enable access of predicted data stored at a host memory. Although various components of the data storage device 102 and the host device 130 depicted herein are illustrated as block components and described in general terms, such components may include one or more microprocessors, state machines, or other circuits configured to enable the controller 120 and/or the processor 132 of FIG. 1 to perform operations described herein. One or more aspects of the controller 120 and/or the processor 132 may be implemented using a microprocessor or microcontroller programmed to perform operations described herein, such as one or more operations of the method 200 of FIG. 2, the method 300 of FIG. 3, the method 400 of FIG. 4, and/or the method 500 of FIG. 5. In a particular embodiment, the controller 120 and/or the processor 132 includes a processor executing instructions that are stored at a memory, such as a non-volatile memory of the data storage device 102 or the host device 130. Alternatively or additionally, executable instructions that are executed by the processor may be stored at a separate memory location that is not part of the non-volatile memory, such as at a read-only memory (ROM) of the data storage device 102 or the host device 130.

In an illustrative example, the processor may execute the instructions to send, from the data storage device to a host device, data predicted to be subject to a read request from the host device. The instructions to send the data may include instructions to receive a read ahead command or a pre-fetch command, instructions to identify the data as predicted data, instructions to identify a logical address (e.g., a logical block address) of the data, instructions to identify a physical address (e.g., a physical block address) of the data, instructions to determine an amount of the data, instructions to generate a write command, instructions to include the data in the write command, instructions to access a tracking table, and/or instructions to identify an available location of a portion of a host memory, as illustrative, non-limiting examples. The processor may execute instructions to store, at the data storage device, an indication that the data is stored at a portion of the host memory so that, based on a read request form the host device for the data, a transfer of the data to the host device from the data storage device can be avoided. The instructions to store the indication may include instructions to instructions to generate an indicator, instructions to store the indicator at a tracking table, and/or instructions to identify the location of the portion of the host memory as unavailable, as illustrative, non-limiting examples.

In another illustrative example, the processor may execute the instructions to receive, at the data storage device from a host device, a read request to read data stored at a non-volatile memory of the data storage device. The instructions to receive the read request may include instructions to identify a logical address (e.g., a logical block address) of the data, instructions to identify a physical address (e.g., a physical block address) of the data, instructions to determine an amount of the data, instructions to determine whether the data is stored at a host memory, and/or instructions to identify the a location of the host memory that stores the data, as illustrative, non-limiting examples. The processor may execute instructions to send, to the host device, a location identifier associated with a location of a portion of the host memory that stores the data, where sending the location identifier relieves the data storage device from transferring the data from the non-volatile memory to the host device responsive to the read request. The instructions to send the location identifier may include instructions to access a tracking table, instructions to identify the location of the host memory that stores the data based on the tracking table, instructions to generate an amount of the data stored at the host memory, and/or instructions to generate the location identifier, as illustrative, non-limiting examples.

The data storage device 102 may be attached to or embedded within one or more host devices, such as within a housing of a host communication device, which may correspond to the host device 130. The data storage device 102 may be within a packaged apparatus such as a wireless telephone, a personal digital assistant (PDA), a gaming device or console, a portable navigation device, a computer device (e.g., a tablet or a laptop), or other device that uses internal non-volatile memory. However, in other embodiments, the data storage device 102 may be a portable device configured to be selectively coupled to one or more external devices, such as the host device 130. For example, the data storage device 102 may be a removable device such as a Universal Serial Bus (USB) flash drive or a removable memory card, as illustrative examples.

In an illustrative example, the processor may execute the instructions to send, from a host device to the data storage device, a read command to read data from a non-volatile memory of the data storage device. The instructions to send the read command may include instructions to determine a logical block address range (e.g., a logical address) to be read, instructions to determine an amount of data to be read, and/or instructions to generate the read command, as illustrative, non-limiting examples. The processor may execute instructions to, responsive to the read command, receive a location identifier associated with a location of a portion of the host memory that stores the data, where the location identifier enables the host device to receive the data responsive to the read command by reading the data directly from the location of the host memory. The instructions to receive the location identifier may include instructions to parse the location identifier, instructions to determine a storage location of a host memory based on the location identifier, instructions to determine an amount of data to be read based on the location identifier, instructions to read the data from the storage location, instructions to provide the data to a processor of the host device, and/or instructions to generate an acknowledgement message associated with the storage location, as illustrative, non-limiting examples.

The host device 130 may correspond to a mobile telephone, a music player, a video player, a gaming device or console, an electronic book reader, a personal digital assistant (PDA), a computer, such as a laptop, a tablet, or a notebook computer, a portable navigation device, another electronic device, or a combination thereof. The host device 130 may communicate via a host controller, which may enable the host device 130 to communicate with the data storage device 102. The host device 130 may operate in compliance with a JEDEC Solid State Technology Association industry specification, such as an embedded MultiMedia Card (eMMC) specification or a Universal Flash Storage (UFS) Host Controller Interface specification. The host device 130 may operate in compliance with one or more other specifications, such as a Secure Digital (SD) Host Controller specification, as an illustrative example. Alternatively, the host device 130 may communicate with the data storage device 102 in accordance with another communication protocol.

The data storage device 102 may be configured to be coupled to the host device 130 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

Semiconductor memory devices, such as the memory 104, the RAM 122, and/or the memory 134, include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., in a NOR memory array. NAND and NOR memory configurations described have been presented as examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor material, such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements arranged on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material, such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. To illustrate, each of the memory device levels may have a corresponding substrate thinned or removed before stacking the memory device levels to form memory arrays. Because each of the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

In some implementations, the memory 104, the RAM 122, and/or the memory 134 is a non-volatile memory having a three-dimensional (3D) memory configuration that is monolithically formed in one or more physical levels of arrays of memory cells having an active area disposed above a silicon substrate. The active area of a memory cell may be an area of the memory cell that is conductively throttled by a charge trap portion of the memory cell. The data storage device 102 and/or the host device 130 may include circuitry, such as read/write circuitry, as an illustrative, non-limiting example, associated with operation of the memory cells.

Associated circuitry is typically used for operation of the memory elements and for communication with the memory elements. As non-limiting examples, memory devices may have circuitry for controlling and driving memory elements to perform functions such as programming and reading. The associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional structures described but cover all relevant memory structures within the spirit and scope of the disclosure as described herein and as understood by one of skill in the art.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
in a data storage device including a non-volatile memory, the data storage device coupled to a host device that includes a host memory, wherein a portion of the host memory is accessible to the data storage device, performing:
predicting data that is to be a subject of a read request from the host device, wherein the predicting is based on a determining of one or more physical addresses using a mapping table and determining an amount of data to read;
generating and storing an indicator at a tracking table of the data storage device prior to sending a copy of data to the host device, wherein the indicator identifies an available location of the host memory of the host device for the data;
sending, to the host device, the copy of data that is predicted to be subject to a read request from the host device; and
prior to receiving the read request for the data from the host device, generating and storing an indication in the tracking table in a controller of the data storage device that includes information signifying to the data storage device that the copy of the data is already available at the portion of the host memory and that the data storage device is to avoid transferring the copy of the data in responding to the read request from the host device.

2. The method of claim 1, further comprising:
receiving, from the host device, a read ahead command that identifies an address or a location of the data; and
predicting, based on the read ahead command, that the data is to be subject to the read request from the host device.

3. The method of claim 1, further comprising:
receiving, from the host device, a pre-fetch command that identifies an address or a location of the data; and
predicting, based on the pre-fetch command, that the data is to be subject to the read request from the host device.

4. The method of claim 1, further comprising:
tracking multiple read requests received from the host device;
identifying a pattern or a sequence that corresponds to the multiple read requests and that includes a first read request to read a first logical address followed by a second read request to read a second logical address that corresponds to the data; and
after identifying the pattern or the sequence:
receiving the first read request; and
in response to receiving the first read request, predicting the data to be subject to the read request.

5. The method of claim 1, wherein the data storage device stores the indication at the non-volatile memory, at a random access memory (RAM) of the data storage device, or at the portion of the host memory.

6. The method of claim 1, wherein the portion of the host memory is controlled by the data storage device.

7. The method of claim 1, wherein the data storage device is configured to use the portion of the host memory as a working memory of the data storage device.

8. The method of claim 1, further comprising instructing the host device to store the copy of the data at the portion of the host memory.

9. The method of claim 1, further comprising:
receiving, from the host device, the read request to read the data from the non-volatile memory;
determining, based on the stored indication, a location identifier that identifies a location within the host memory at which the copy of the data is stored; and
sending the location identifier to the host device to enable the host device to read the copy of the data directly from the location within the host memory.

10. The method of claim 1, wherein:
the non-volatile memory includes a three-dimensional (3D) memory configuration that is monolithically formed in one or more physical levels of arrays of memory cells having an active area disposed above a silicon substrate; and
the data storage device includes circuitry associated with operation of the memory cells.

11. A method comprising:
in a data storage device including a non-volatile memory with a tracking table in a controller of the data storage device, the data storage device coupled to a host device that includes a host memory, wherein a portion of the host memory is accessible to the data storage device, performing:
predicting data that is to be a subject of a read request from the host device, wherein the predicting is based on a determining of one or more physical addresses using a mapping table and determining an amount of data to read;
generating and storing an indicator at the tracking table in the controller of the data storage device prior to sending a copy of data to the host device, wherein the indicator identifies an available location of the memory of the host device for the data;
sending, to the host device, the copy of data predicted to be a subject of a read request from the host device;
receiving, from the host device, the read request to read data stored at the non-volatile memory; and
sending, to the host device, a location identifier identifying a location within the portion of the host memory at which the copy of the data is stored, wherein sending the location identifier relieves the data storage device from transferring the data from the non-volatile memory to the host device responsive to the read request.

12. The method of claim 11, wherein sending the location identifier to the host device enables the host device to read the copy of the data directly from the location.

13. The method of claim 11, further comprising:
sending, to the host device, the copy of the data to be stored at the portion of the host memory prior to receiving the read request; and
in response to the read request, determining whether the copy of the data is stored at the host memory.

14. The method of claim 11, further comprising sending, to the host device, a response message indicating that the data storage device completed execution of the read request, wherein the data storage device sends the response message without sending the data to the host device responsive to the read request.

15. A data storage device comprising:
a controller, within the data storage device, with a random access memory, a tracking table in the random access memory, the tracking table having at least one indicator and configured to predict a subject of a read request from a host device, wherein the predicting is based on a determining of one or more physical addresses using a mapping table and determining an amount of data to read; and a non-volatile memory operatively coupled to the controller and configured to store data received from the host device wherein the host device includes a host memory having a portion that is accessible to the controller;

wherein the controller is configured to:

generate and store an indicator at the tracking table in the controller of the data storage device prior to sending a copy of data to the host device, wherein the indicator identifies an available location of the memory of the host device for the data;

send, to the host device, the copy of data predicted to be a subject of a read request from the host device;

receive, from the host device, a read request to read data stored at the non-volatile memory; and send, to the host device, a location identifier identifying a location within the portion of the host memory at which the copy of the data is stored, and wherein sending the location identifier relieves the controller from transferring the data from the non-volatile memory to the host device responsive to the read request.

16. The data storage device of claim 15, wherein the controller is further configured to:

prior to receiving the read request, send the copy of the data to the host device to be written to the location within the portion of the host memory;

track an amount of time that the data is stored at the location within the portion of the host memory; and responsive to the amount of time satisfying a threshold, update the tracking table in the controller of the data storage device to indicate that the location within the portion of the host memory is available for the data storage device to store different data.

17. The data storage device of claim 15, wherein the controller is further configured to:

receive an acknowledgement message from the host device that indicates that the host device accessed the copy of the data from the portion of the host memory and indicates that the location within the portion of the host memory is available such that the controller may store different data at the location; and responsive to receiving the acknowledgement message, update the tracking table in the controller of the data storage device to indicate that the location within the portion of the host memory is available for the data storage device to store the different data.

18. The data storage device of claim 15, wherein the non-volatile memory includes a three-dimensional (3D) memory configuration that is monolithically formed in one or more physical levels of arrays of memory cells having an active area disposed above a silicon substrate, and further comprising circuitry associated with operation of the memory cells.

19. An arrangement, disposed in a host device including a host memory, the host device configured to be coupled to a data storage device that includes a non-volatile memory, wherein a portion of the host memory is accessible to the data storage device, comprising:

means for predicting data that is to be a subject of a read request from the host device, wherein the predicting is based on a determining of one or more physical addresses using a mapping table and determining an amount of data to read;

means for generating and storing an indicator at a tracking table of the data storage device prior to sending a copy of data to the host device, wherein the indicator identifies an available location of the memory of the host device for the data;

means for receiving, at the host device, the copy of data predicted to be a subject of a read request from the host device;

means for sending, to the data storage device, a read command to a controller within the data storage device, the controller configured with a random access memory and the tracking table in the controller of the data storage device with indicator to read data from the non-volatile memory; and means for receiving, in response to the read command, from the data storage device, a location identifier that identifies a location within the portion of the host memory at which the copy of the data is stored and that enables the host device to receive the data responsive to the read command by reading the copy of the data directly from the location within the host memory, wherein the location identifier relieves the data storage device from transferring the data from the non-volatile memory to the host device responsive to the read command.

20. The arrangement of claim 19, further comprising:

means for reading the copy of the data directly from the location within the host memory based on the location identifier; and means for sending, to the data storage device, an acknowledged message that indicates to the data storage device that the portion of the host memory is available for the data storage device to store second data at the location.

21. The arrangement of claim 19, further comprising:

means for sending an initial read command to the data storage device; and means for receiving, responsive to the initial read command, the copy of the data and an instruction from the data storage device to perform a write operation at the portion of the host memory to write the copy of the data to the portion of the host memory.

22. The arrangement of claim 19, further comprising: means for sending, to the data storage device, a read ahead command that identifies an address or a location of the non-volatile memory where the data is stored.

* * * * *